US008676654B2

(12) United States Patent
Lawton (10) Patent No.: US 8,676,654 B2
(45) Date of Patent: Mar. 18, 2014

(54) METHOD AND SYSTEM FOR FACILITATING A PURCHASE PROCESS

(75) Inventor: Daniel J. Lawton, Bloomsburg, PA (US)

(73) Assignee: eBiz Industries, Inc., Bloomsburg, PA (US)

(*) Notice: Subject to any disclaimer, the term of this patent is extended or adjusted under 35 U.S.C. 154(b) by 2284 days.

(21) Appl. No.: 11/349,382

(22) Filed: Feb. 7, 2006

(65) Prior Publication Data

US 2007/0185775 A1    Aug. 9, 2007

(51) Int. Cl.
*G06Q 30/00* (2012.01)

(52) U.S. Cl.
USPC ............ 705/26.1; 705/27.1; 705/37; 705/400

(58) Field of Classification Search
USPC ................ 705/26, 27, 37, 400, 26.1, 27.1
See application file for complete search history.

(56) References Cited

U.S. PATENT DOCUMENTS

| | | | |
|---|---|---|---|
| 4,799,156 A | 1/1989 | Shavit et al. | |
| 4,903,201 A | 2/1990 | Wagner | |
| 5,168,446 A | 12/1992 | Wiseman | |
| 5,557,518 A | 9/1996 | Rosen | |
| 5,794,207 A | 8/1998 | Walker et al. | |
| 5,797,127 A | 8/1998 | Walker et al. | |
| 5,832,459 A * | 11/1998 | Cameron et al. ............... | 705/26 |
| 5,897,620 A | 4/1999 | Walker et al. | |
| 6,035,288 A | 3/2000 | Solomon | |
| 6,058,417 A | 5/2000 | Hess et al. | |
| 6,085,169 A | 7/2000 | Walker et al. | |
| 6,332,129 B1 | 12/2001 | Walker et al. | |
| 6,345,090 B1 | 2/2002 | Walker et al. | |
| 6,356,878 B1 | 3/2002 | Walker et al. | |
| 6,415,320 B1 | 7/2002 | Hess et al. | |
| 6,484,153 B1 | 11/2002 | Walker et al. | |
| 6,510,418 B1 | 1/2003 | Case et al. | |
| 6,553,346 B1 | 4/2003 | Walker et al. | |
| 6,574,608 B1 | 6/2003 | Dahod et al. | |
| 6,647,373 B1 | 11/2003 | Carlton-Foss | |
| 6,725,204 B1 | 4/2004 | Gusley | |
| 2001/0032163 A1 | 10/2001 | Fertik et al. | |
| 2001/0032164 A1 | 10/2001 | Kim | |
| 2002/0023042 A1 | 2/2002 | Solomon | |
| 2002/0029187 A1 | 3/2002 | Meehan et al. | |

(Continued)

OTHER PUBLICATIONS

International Search Report and Written Opinion from corresponding Application No. PCT/US07/03408, dated Sep. 11, 2007.

*Primary Examiner* — Yogesh C Garg
(74) *Attorney, Agent, or Firm* — Hooker & Habib, P.C.

(57) ABSTRACT

A transaction system and method is provided for enabling potential buyers to purchase goods through reverse on-line auction process. The transaction system is configured to automatically receive periodic uploads of information regarding goods for sale by suppliers and to store this information in a database. A potential buyer can login to the transaction system and submit searches for goods based on a variety of parameters which may include condition, warranty, and revision. The potential buyer also submits an offer price for each requested item. The transaction system queries the database to determine if the requested goods are available. The transaction system selects the vendor so as to maximize the sales margin and then determines whether the buyer's offer can be accepted based on predetermined margin requirements. If the buyer's offer can be accepted, the system generates an acceptance to the offer from the buyer and generates a purchase order to the selected supplier.

12 Claims, 10 Drawing Sheets

(56) References Cited

U.S. PATENT DOCUMENTS

| | | |
|---|---|---|
| 2002/0059132 A1 | 5/2002 | Quay et al. |
| 2002/0099643 A1 | 7/2002 | Abeshouse et al. |
| 2002/0184135 A1 | 12/2002 | Zakaria |
| 2003/0033260 A1* | 2/2003 | Yashiro et al. ............... 705/400 |
| 2003/0177026 A1 | 9/2003 | Purcell |
| 2003/0208436 A1 | 11/2003 | Boyle et al. |
| 2004/0138986 A1 | 7/2004 | Petrovich |
| 2005/0273417 A1* | 12/2005 | Budish ........................... 705/37 |
| 2006/0240396 A1* | 10/2006 | Foo et al. ...................... 434/350 |

* cited by examiner

| Part Number | Vendor's Cost | Vendor's Markup | Distributor's Cost | Vendor | Distributor Target MU | Distributor Final Profit |
|---|---|---|---|---|---|---|
| 9114 - 000 - 000 | $37 | 20% | $44.4 | ABC | 20% | 35% |
| 9114 - 000 - 000 | $42 | 20% | $50.4 | DEF | 20% | 19% |
| 9114 - 000 - 000 | $26 | 20% | $31.2 | XYZ | 20% | 92% |
| 9114 - 000 - 000 | NA | NA | $42 | PQR | 20% | 43% |

METHOD AND SYSTEM FOR FACILITATING A PURCHASE PROCESS

BACKGROUND OF THE INVENTION

1. Field of Invention

This invention relates to a method and system for facilitating a purchase process, and more specifically, to a computer implemented method and system for facilitating a purchase process.

2. Description of Related Art

Various web-based business-to-business selling and buying processes have been developed. In one example, vendors have an on-line storefront as its main business or an extension of a "brick and mortar" establishment. These vendors post their products available for sale on-line and provide the terms of sale, including the price, and customers place purchase orders to purchase such products if interested and accept the vendors' terms of sale. These vendors do not negotiate with their customers on-line, and the products available for purchase by the customers are limited to those products posted on-line by the vendors.

There are also on-line services which help vendors and customers locate each other. A customer locates a vendor or vice versa on-line through such service, but the purchase transaction takes place off-line. These services can be industry specific and charge a monthly service fee for the users. An example of such service is www.Telecomfinders.com. This service allows customers to locate vendors of new, refurbished, and used telecommunications products.

There are other on-line services which help customers and vendors locate each other and allow them to transact business on-line. For example, some of these services provide an on-line auction. The auction items are posted by the vendors, and the vendors dictate the quantity, condition and minimum price that they are willing to accept. The vendors then sell the auction items to the highest bidders. In this setting, the customers do not have the flexibility to customize their purchase offers by requesting a particular product, quantity or price based on the customers' specific needs. The customers' only choices are to submit a bid for an item or not and, if a customer is submitting a bid, the purchase price that it is willing to pay. An example of such service is eBay.

There are still other on-line services which bring vendors and customers together and permit an on-line transaction through a reverse-auction process. In this process, the customer, rather than the vendors, defines what product the customer wishes to purchase, along with the price it is willing to pay, and the vendors essentially bid to sell to the customer once the service provider forwards the purchase offer information to the vendors. An example of such services is the Name Your Own Price™ feature of Priceline.com.

Before the wide use of the internet, business transactions between vendors and customers typically involved negotiations as to the purchase terms, which could take a long time for an agreement to be consummated and for the transaction to take place. With the introduction of the internet, including on-line reverse auction process, business transactions have become much more efficient. Nevertheless, none of the existing on-line reverse auction processes is ideal for a distributor in business-to-business electronic commerce ("B-to-B E-Commerce") to run a virtual company without any inventory. Distributors are entities that purchase products from manufacturers or other vendors and subsequently resell them to other customers. The customers can be end users, distributors, dealers, or interconnect. Distributors take title to the products they purchase. Distributors are not merely facilitators of transactions between the vendors and the customers.

Distributors typically purchase a wide variety of products from vendors and resell them to customers at a margin. Distributors provide value by using their knowledge of the relevant market. Distributors know what products are offered by which vendors, the vendor prices, product availability, and other terms and conditions of transactions. Distributors also know their customers' needs, the customers' applications, and prices the customers are willing to pay. For example, a distributor may be able to purchase excess inventory from a vendor at a price lower than the market price or buy products at a volume discount and resell them to customers at substantially higher margin. A distributor's ability to make profit depends entirely on its access to such information. However, traditionally, a distributor must purchase the products from the vendors first, and until the distributor is able to resell them to customers, the distributor must carry the cost of inventory and risk of loss. In addition, the market conditions may change and the distributor may not be able to resell the products at the higher margin as previously expected. Therefore, it would be useful for a distributor to be able to operate its business as a virtual entity without any inventory and to purchase the products from the vendors only after the distributor has lined up its own customers for the products to eliminate these risks. It would also be useful to provide a more efficient market, where information concerning all available products are readily available to the customers.

A distributor in a B-to-B E-Commerce market for industrial assets has a unique opportunity to make money. Industrial assets are fairly expensive equipment and products that organizations need to operate. Examples of industrial assets are telecommunications, aviation, heavy equipment and medical systems, devices, and parts. In the marketplace, there are excess or idle inventory and refurbished or used industrial assets available that vendors are willing to sell at less than standard market rates. Also, such industrial assets can have different value to different vendors, which leads to significant incongruity in the market. For example, one vendor may be the manufacturer with excess inventory of a particular Central Office equipment, where the list price for this equipment is $7000. Although this vendor wants to get rid of the inventory to avoid the cost of carrying this inventory, the vendor knows that eventually he would be able to sell the product to a customer and does not wish to dilute the market. Therefore, this vendor may be willing to sell the equipment for $5000. Another vendor may be an end user customer who purchased excess inventory of such equipment. This vendor has no need for the excess inventory which has been paid for and has no access to customers who are in need of such equipment. Therefore, this vendor may be willing to sell the equipment at a significantly lower price of $3000. At the same time, there may be a customer in need of such equipment, who may be looking for a bargain, and is willing to pay $6000 for it, knowing that the market rate is $7000. The distributor who has access to this information and a relationship with both the customer and the two vendors has an opportunity to make a profit. The distributor has a choice between buying from the first vendor and reselling to the customer to make a profit of $2000, or buying from the second vendor and reselling to the customer to make a profit of $3000. Obviously, the distributor would buy from the second vendor. Therefore, having access to such information is critical to the success of such distributor.

In addition, this distributor typically faces sophisticated customers who know exactly what products they want and under what terms and conditions they want to purchase those products. For example, the customer may be in need of one specific Central Office equipment from a particular vendor that is of a specific model and revision. The customer may be looking for a used one to save money but wants installation and a 90 day warranty period. As in an on-line reverse auction process, once the distributor receives this purchase order from the customer, the distributor then has to try to find the product so that the distributor can accept the purchase order. It would be useful for such distributor to have access to up-to-date information concerning various industrial assets available for sale, including their description and prices at which the vendors are willing to sell those products, and in particular a database which collects the information that the distributor needs in a form that is convenient to the distributor. Having access to up-to-date information of products available for sale and a system and method to permit a distributor to purchase a product on-line from a vendor immediately prior to accepting the purchase order from a customer placed through an on-line reverse auction process would enhance the distributor in a B-to-B market to efficiently maximize profit.

SUMMARY OF THE INVENTION

The present invention provides a novel transaction system and method which overcomes these and other deficiencies of the prior art. The present invention utilizes automated electronic methods such as the internet, web services, client-server distributed computing, and other electronic transaction means.

In one aspect, the invention features a computer implemented method for processing the sale of goods. According to this method, a computer receives an offer from a buyer to purchase a good at a buyer offer price. A database comprising a list of goods of at least one supplier that are available for sale at a supplier price is accessed and queried to determine whether the good the buyer offers to purchase is available. A sales margin is calculated based on the difference between the buyer offer price and the supplier price, and if sales margin exceeds a predetermined margin, the computer generates an acceptance to the buyer's offer and a purchase order to purchase the good from the supplier. In another aspect, if the requested good is available from multiple suppliers, the supplier that provides the highest sales margin is selected. If the requested good is not available for sale, a counter offer is generated to the buyer for an alternate good that is available for sale. If the buyer accepts the alternate good, the computer generates a purchase order to the supplier from whom the alternate good is available for sale to purchase the alternate good to fill the customer's order.

In one embodiment, the transaction system comprises a database and a processor. The database comprises a list of goods for sale by a plurality of suppliers, including supplier prices for each item. The processor comprises a plurality of modules. A first module automatically receives from suppliers up-to-date information on goods, and updates the database to reflect the information. A second module is configured to electronically communicate with a buyer by providing an item search form, to receive a purchase offer from the buyer that includes a buyer offer price, and to query the database to determine if the requested item is available. A third module determines whether the sales margin is acceptable based on the purchase offer price and the supplier sale price, generating an acceptance to the buyer's offer if the sales margin is acceptable, and if not acceptable, determining whether the offer price is reasonable. A fourth module generates a purchase order to the supplier to purchase the item after acceptance of the buyer's offer. A fifth module provides product information to a shipping service server, receives up-to-date shipping rates from the server, and relays the shipping rates to the second module where they are used in calculating a total cost for the item.

The transaction system and methods of the present invention allow a business entity such as a distributor to provide potential buyers with a current listing of goods available from a plurality of suppliers. The transaction method automatically calculates total costs, including supplier price and shipping, and the resulting sales margins to ensure that a predetermined sales margin or total price is received. Furthermore, where an item is available from multiple suppliers, the sales margin is automatically maximized by selecting the supplier with the lowest asking price. Finally, the system automatically obtains current shipping rates and incorporates the rates into the calculations of total cost.

The foregoing, and other features and advantages of the invention, will be apparent from the following, more particular description of the preferred embodiments of the invention, the accompanying drawings, and the claims.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF EMBODIMENTS

Further features and advantages of the invention, as well as the structure and operation of various embodiments of the invention, are described in detail below with reference to the accompanying FIGS. 1-10, wherein like reference numerals refer to like elements. The terms "customer" and "buyer" are used interchangeably to refer to the party that uses the transaction system of the present invention to potentially purchase a product from the distributor. Similarly, the terms "supplier,"

"vendor," and "seller" are interchangeably used to refer to the party that supplies the various goods or services to the distributor that are eventually purchased by the customer via the transaction system of the present invention. The embodiments of the invention are described in the context of a distributor of telecommunications systems and products. Nonetheless, one of ordinary skill in the art readily recognizes that the present invention may take on other embodiments that allow its application in other contexts not specifically addressed herein, including but not limited to other industrial assets such as aviation, heavy equipment, and medical systems, devices, and parts. In the telecommunications industry, a customer can be an end user, interconnect, distributor, or a dealer. An end user is an entity that uses the product purchased. An interconnect is an entity that sells, installs and maintains the telephone systems. A distributor is an entity that buys and sells used equipment to a wholesale market. A distributor typically does carry inventory but does not offer service or installation. A dealer is an entity that sells the telephone systems with the support of the original equipment manufacturer or the manufacturer.

Figure 1:
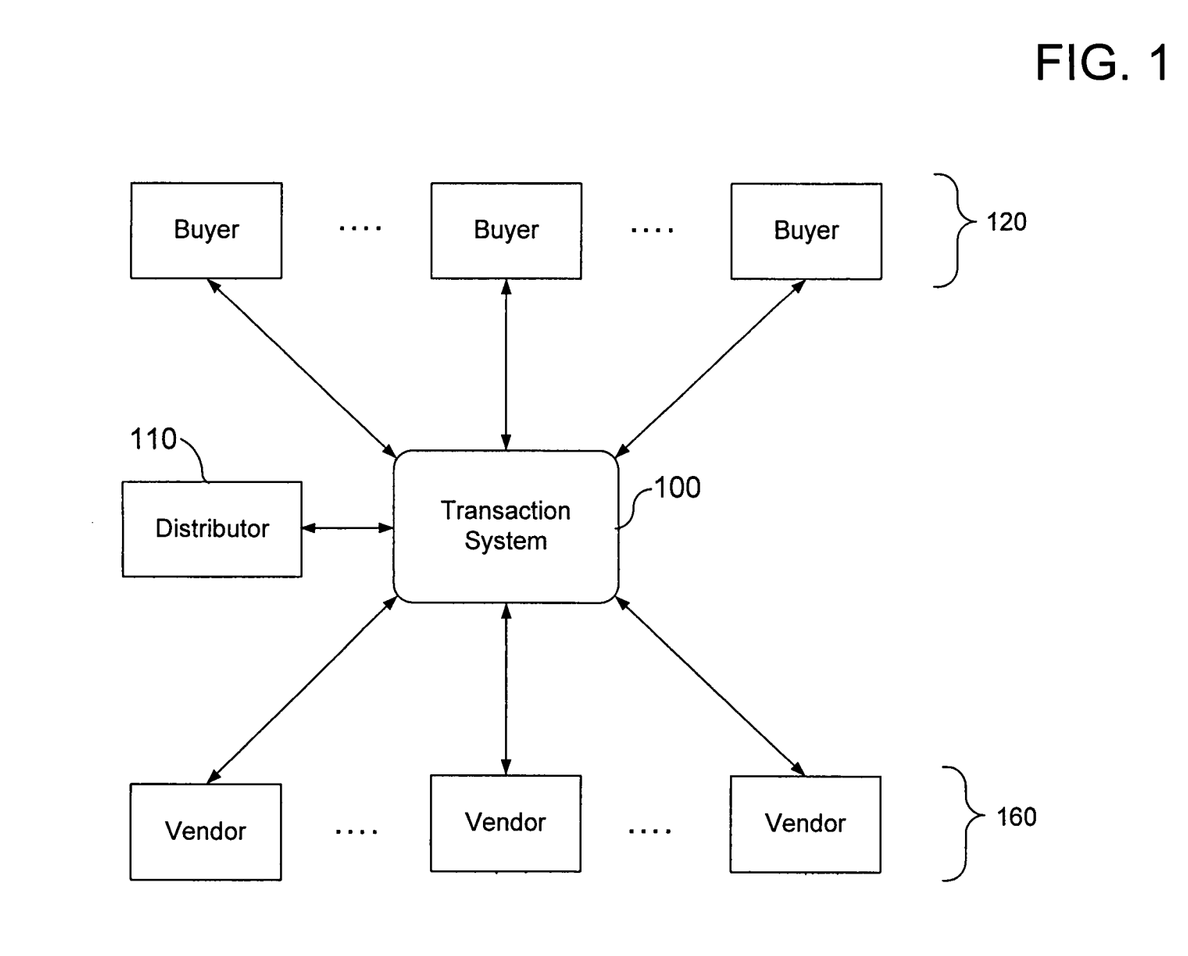
FIG. 1 illustrates a transaction system operating with a plurality of buyers and sellers.

FIG. 1 illustrates an exemplary embodiment of the present invention. Transaction system 100 is operated by a distributor 110 and interfaces with a plurality of buyers 120 and sellers 160. The distributor 110 implements transaction system 100 to purchase goods from a seller and to resell those goods to a buyer. For example, distributor 110 can utilize transaction system 100 to become a distributor of industrial assets such as telecommunications, aviation, heavy equipment, and medical systems, devices, and parts. A distributor buys goods or services from a vendor, taking title to the goods or services, and then resells the goods or services to a buyer for a profit. Transaction system 100 is particularly useful for a distributor who does not wish to maintain inventory of product, but rather, arranges for the direct shipment of goods from the vendor to the buyer. However, transaction system 100 can also be used by a distributor who takes delivery (i.e., physical possession) of the goods before re-shipping the goods to the buyer.

In one embodiment, transaction system 100 utilizes a database driven web application to implement the system 100. As shown by the double-sided arrows in FIG. 1, transaction system 100 exchanges information with buyers 110 and vendors 160. For example, transaction system 100 can automatically receive periodic uploads of standardized data files from vendors 160 regarding products or services that are currently being offered for sale. This information can then be stored in a database within transaction system 100 that can be accessed and viewed by registered users of transaction system 100. Similarly, transaction system 100 receives search forms from buyers 10 that request specific goods or services that the buyer would like to purchase. The buyers can also specify parameters such as condition, warranty, color, etc. Furthermore, the transaction system 100 is configured to receive offer prices submitted by the buyers 110. The database within transaction system 100 is queried to determine if the specified goods or services are available from one or more vendors. The transaction system selects the vendor so as to maximize profit and then determines whether the buyer's offer will be accepted based on predetermined criteria. The transaction system 100 is described in more detail below.

Figure 2:
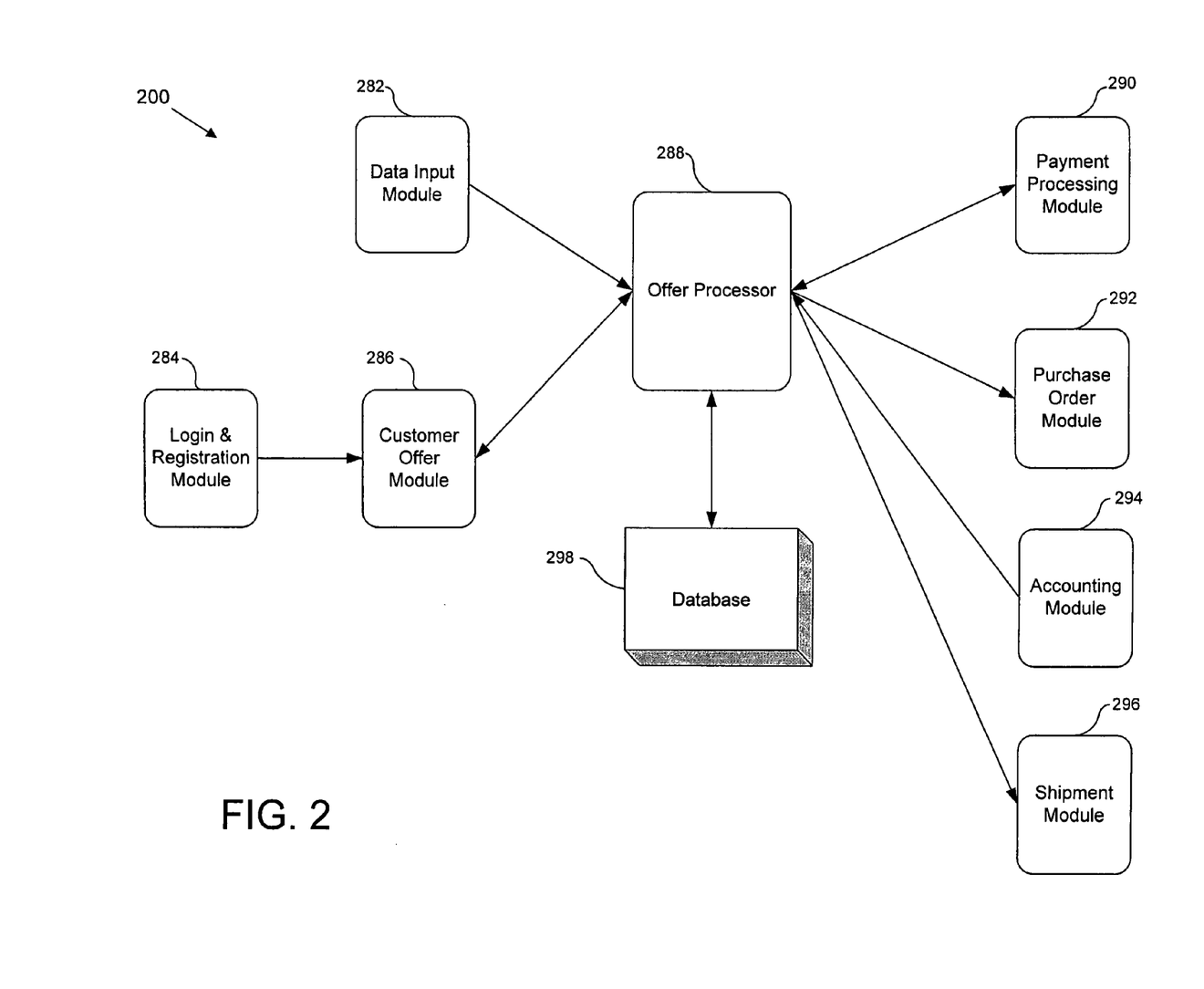
FIG. 2 illustrates a modular overview of a transaction system in accordance with an exemplary embodiment of the present invention.

Referring to FIG. 2, transaction system 200 provides a modular representation of a transaction system in accordance with an exemplary embodiment of the present invention. Transaction system 200 comprises nine functional modules. The various modules shown in FIG. 2 do not necessarily correspond to a particular division or configuration of hardware components, nor are the modules meant to suggest any particular sequence of operations. Rather, transaction system 200 is a conceptual overview shown in terms of separate modules for the purpose of identifying and describing the functional aspects of the present invention. In the exemplary embodiment of the invention described below, transaction system 200 is implemented by a database-driven web application. The transaction system 200 is primarily configured to interact with three classes of users, including customers who are potential buyers of products, vendors who post products for sale, and the distributor who is operating the transaction system 200.

In one embodiment, offer processor 288 is a web-based application that is driven by database 298. Transaction system 200 can be operated using a conventional server that is implemented using an application server and a database server. For example, ColdFusion MX 7.01 can be used as the application server and Microsoft SQL Server 200 can be used the database server. Transaction system 200 further comprises a plurality of modules, each having a different function in the transaction process and briefly described below. The data input module 282 is used to enter distributor data, such as lists of alternative part numbers, vendor inventory files, margin requirements, and operational data. Data input module 282 is also used to obtain up-to-date information from vendors regarding the products that they currently have for sale. The login and registration module 284 provides a capability for authenticating users and providing access only to authenticated, registered users. The customer offer module 286 allows customers to search for part numbers and offer price and term requirements that the distributor must be able to meet. The offer processor 288 determines whether the customer search specifications can be met by an existing part, or whether an alternative part should be suggested, and determines whether the offered price is reasonable. Data resulting from customer and vendor interactions are stored in the data interactions database 298, where order history is stored for use in each user's customized page. The payment processing module 290 handles customer payments to the distributor, and records distributor payments to vendors. The purchase order module 292 records transactions as they occur, and structures transactions into a purchase order format. An accounting module 294 tracks the flow of money to document user purchases, margin calculations, vendor payments, shipping costs, overhead, and other distributor accounting functions. A shipment module 296 tracks the shipping methods used for each purchase, and records shipment data to verify acceptance by buyers and release of products by vendors. Payment processing module 290, purchase order module 292, accounting module 294, and shipment module 296 will be collectively referred to as the "check-out modules" because they perform functions relating to completing the sale after the system has accepted a customer's offer to purchase a product. The various elements of transaction system 200 will now be described in greater detail.

The data input module 282 allows the system 200 to receive up-to-date product information from vendors (product suppliers) as well as the distributor who is operating transaction system 200. This product information is organized and stored in a product catalog within database 298, which is periodically updated to reflect new information. In one embodiment, database 298 is updated with vendor information in real-time through constant communication using methods well known to those skilled in the art. In another embodiment, database 298 is periodically updated with information provided by the vendors. With respect to the distributor, data input module 282 is used to enter operational data (e.g., margin requirements) and product information (e.g., alternate product listings). Such information can be entered by the distributor via data input module 282 using password-protected web forms, for example. With respect to the vendors, data input module 282 is used to upload product information including the part number, manufacturer, color, inventory, description, vendor cost, vendor markup, condition, shipping options, available warranty, and revision availability. In an exemplary embodiment, transaction system 200 receives and stores vendor product information as follows.

The data input module 282 can employ a standard spreadsheet template (e.g., Microsoft Excel) that the distributor will supply to each vendor so that vendor information is received in a standardized format. The distributor can include vendor identification in the spreadsheet filename and within the spreadsheet itself in order to link the spreadsheet to a particular vendor. The vendor populates the spreadsheet with product information associated with their current inventory. The information contained in the spreadsheet is then uploaded as a file to the distributor's server at predetermined intervals, or alternatively, in real-time using methods known in the art. For example, the system 200 may provide secure ftp-access to allow vendors to upload the spreadsheet file to an upload folder on the distributor's server. This server within transaction system 200 can automatically monitor the contents of the upload folder using a scripting or programming language such as ColdFusion, for example. The ColdFusion component will trigger the import of the spreadsheet into a temporary database table. When a file is detected, the transaction system 200 will utilize ColdFusion to automatically parse the file and the resulting information is used to add, delete, or update the existing product catalog in database 298. To ensure that the distributor's database 298 contains accurate, up-to-date information, the vendor should immediately update their own database when their inventory changes (e.g. when the vendor ships a product).

The customer login and registration module 284 provides for secure access by a user/customer to the transaction system 200. A user can access the system 200 by visiting a website via an internet connection. Login and registration module 284 contains a password-protected area that is personalized to the user and provides for secure (e.g., SSL certified) transactions between client and server. Module 284 automatically redirects new users of system 200 to a registration page. Registration requires a user to provide personal information (e.g., name, address, and shipping preference), login information (e.g., username and password), as well as identifying themselves by a user type (e.g., end user, interconnect, reseller, or dealer). The registration information entered into module 284 is stored in database 298 in order to expedite future visits and provide a more personalized experience.

Additionally, users have the option of storing their login information on their computer to allow access to system 200 without having to login. The user can do so upon login by storing a "cookie" on their computer that will remember the login information and provide automatic login for future visits. Any transactions occurring after the user has logged in are secured (e.g., SSL 128-bit encryption). The security of the system can be enhanced by making passwords non-retrievable such that they must be reset in the event that a user loses their password. Moreover, security risks can be minimized if credit card information is not stored in the database 298. On subsequent visits, users who have stored their information will not be redirected to the registration screen, but will be provided with a link through which they can edit their registration information in the future. Instead of being redirected to the registration screen, the user will be automatically forwarded to a customized welcome screen that displays their previous purchase history. If a user does not want to be remembered by the system, they can enter their username and password on a login form that is accessible from the registration page. The distributor can also gain access through login and registration module 284.

After accessing the system via login and registration module 284, the user utilizes customer offer module 286. The customer offer module 286 interacts with offer processor 288 by sending product queries and receiving results. Customer offer module 286 comprises a sequence of web pages with search forms that allow the user to search database 298 for particular products. In these search forms, the user can specify product parameters (e.g., manufacturer, part number, etc.) and additional parameters such as product condition, warranty information, available revisions, and shipping information. The user may also search for products using a keyword search of the item descriptions in database 298. Product condition options can include, for example, out-of-service, used, unused, and certified equipment. The product warranty refers to the duration or type of option and can include, for example, 90 days, 120 days, one year, or no warranty. The revision option will be a yes or no decision. Shipping options available to the customer can include, for example, next day, 2-day, 3-day, or 5-7 day ground shipping. The shipping selection is later used in the check-out process by shipping module 296, as described below. Customer offer module 286 also provides a payment setup process in which the user provides information that is required before an offer can be made or evaluated. In response to a product query sent by customer offer module 286, database 298 returns a list of items, if any, that match the search parameters. If no matching items were found, a list of alternate but similar items is displayed (see step 620 in process 600 of FIG. 6). For example, the alternate item may be of the requested manufacturer and part number, but may be of a different color than requested. Various products may be linked to alternates based on distributor input and/or the similarity in product numbers. For example, each manufacturer part number has a unique sequence of digits that are the same for similar products. The customer offer module 286 can be set up to recognize such pattern.

As indicated by FIG. 2, offer processor 288 exchanges data with database 298, data input module 282, and the post-processing modules. The data exchange occurs primarily through the processing of form data, the sending of HTML replies, and XML output sent to the external processes. Based on the product information submitted via customer offer module 286 (e.g., product type, warranty, condition, offer price) and the applicable target margin, offer processor 288 directs the customer to one of several possible screens as described in product search process 600 of FIG. 6. For example, offer processor 288 can direct the customer to an alternate offer page, a higher offer request page, a no availability page, or a confirmation and processing page. Upon receipt of an offer via customer offer module 286, a query is run in database 298 of all products that match the customer-selected product information (e.g., number, condition, warranty, etc.). The information obtained from database 298 includes the number of units available, cost (c), markup percentage (m), target markup, and the minimum acceptable markup. The database query results are sorted in descending order by the following formula:

$$fm = o - tc = o - (c + 0.01mc)$$

where fm is the final distributor markup, o is the customer offer price, tc is the total cost for the distributor, c is the vendor's cost, and m is the vendor's markup percentage.

Figure 9:
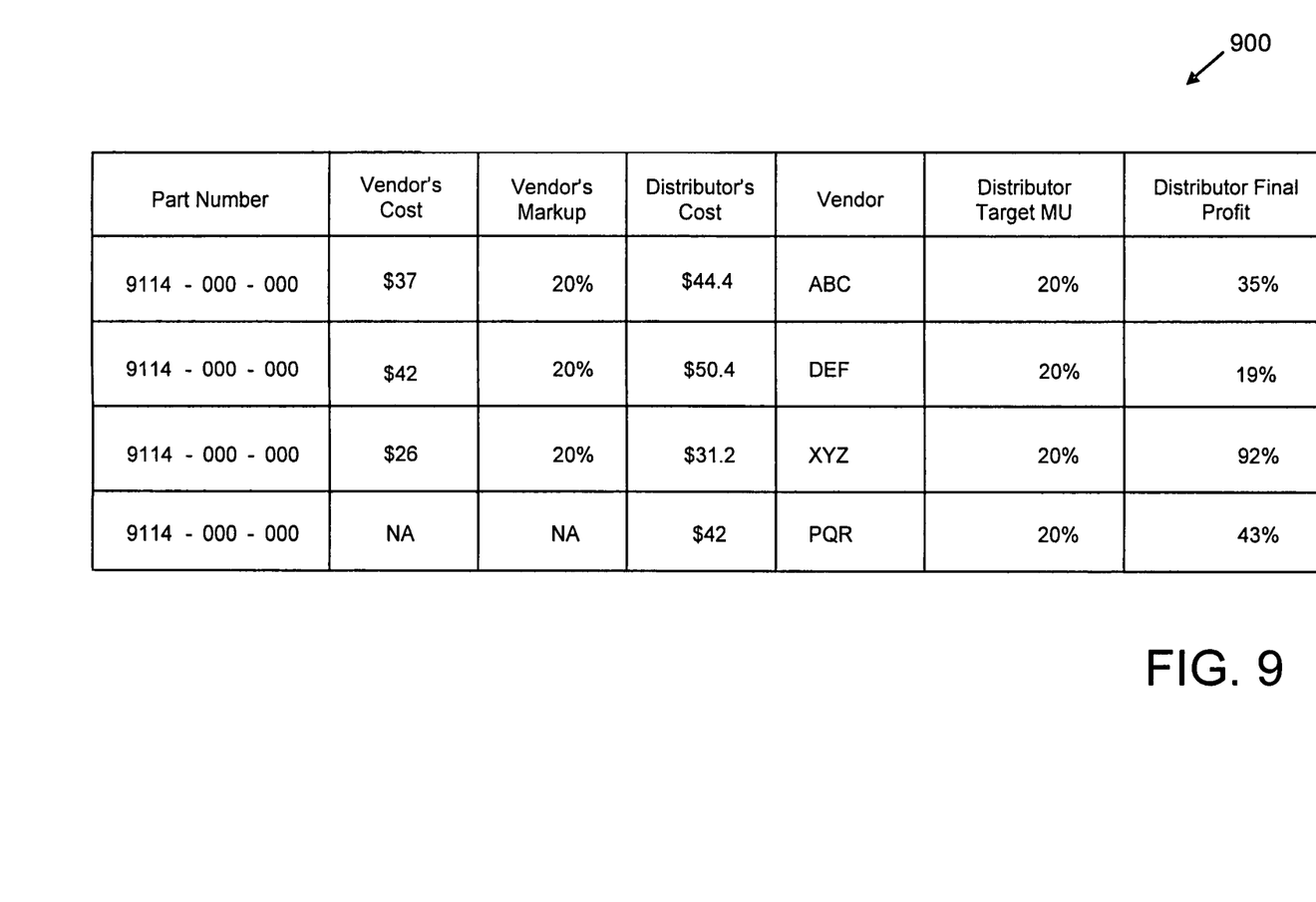
FIG. 9 illustrates a screenshot of a product margin chart in accordance with an exemplary embodiment of the present invention.

Thus, items whose markup is larger than the target markup are considered for sale listed in the order of highest final profit to lowest final markup. The description of product margin chart 900 of FIG. 9 provides an exemplary offer process in which the above formula is implemented to yield final markup (i.e., final profit) percentages for a product available from a plurality of vendors. As just described, offer processor 288 determines whether an offer is accepted, and if so, when the check-out process should begin. With respect to the check-out process, offer processor 288 initializes the check-out modules, communicates with the initialized check-out modules, and is responsible for shutting down the check-out modules when their operation is no longer needed. Thus, offer processor 288 delivers the appropriate data to each of the check-out modules so that each can complete its given task.

The functioning of the check-out modules will now be described. Payment processing module 290 receives information from offer processor 288 and communicates with the chosen online payment company in order to pay for the item. Multiple payment options are available to the customer, e.g., Visa, Mastercard, American Express, PayPal, debit card, or bank transfer. Each of the available online payment companies will provide an external application that allows for interface with payment processing module 290. The payment processing module 290 can interface with the various external applications using HyperText Transfer Protocol (HTTP) form submissions. The payment request sent to the online payment company will be received by an application running on the online payment company server, which will process the request and complete payment from the customer to the distributor. Upon completion of the payment transaction, a response is sent from the online payment service server to the distributor server. The information contained in the response is used to inform the customer of the transaction status.

The use of an online payment system for the electronic transactions provides additional security for the auctioneer and the customer. The information submitted from payment processing module 290 to the online payment company server can be encrypted using Secure Socket Layers (SSL) and digital certificates. Encrypting the information ensures that the integrity and security of the transaction information is maintained throughout the payment process. For example, a 128-bit SSL connection can be used to communicate with the online payment company server, and it is preferred that the online payment company service provide some type of digital certificate technology. The payment module 290 can interface with the online payment company by one of two methods depending on the level of service chosen by the distributor of transaction system 200. Using a first method, HTML-based forms can be sent through a secure connection to the online payment server. In a second method, Xtensible Markup Language (XML) based transactions can be used. In either case, the payment processing module receives the information required to complete the transaction from offer processor 288.

The shipping module 296 provides for communication between the offer processor 288 and the selected shipping company's servers. As mentioned above, the shipping module can be initialized by offer processor 288 at the start of the payment process. Shipping module 296 receives up-to-date shipping rates from the shipping company servers. This cost is then sent to offer processor 288 which calculates the total cost of shipping the purchased items and includes it in the payment amount. To obtain an accurate shipping cost quote, shipping module 296 provides the shipping company server with product information including the package weight, package size, origin zip code, and destination zip code. The shipper's servers will process the data, determine a shipping cost, and then generate a response to shipping module 296 that includes information about current rates for various services. The shipping service may be chosen by the distributor of transaction system 200 and, alternatively, the customer can choose to use their own shipping accounts. In one embodiment, the purchased item is shipped directly from the vendor to the buyer. However, in another embodiment the distributor of the transaction system 200 can take delivery of the item before shipping it to the buyer. The shipping module 296 can communicate with the selected shipping service server using XML formatted data that is sent to the shipping company servers via a SSL connection. Each shipping service typically defines a proprietary XML format that is transmitted to and from their servers. The shipping company server's response can be an XML-based communication that is processed by shipping module 296 and relayed to offer processor 288. The shipping module 296 can use ColdFusion code to process both the outgoing and incoming XML streams. For outgoing XML, code within shipping module 296 use objects received from offer processor 288 to create the required XML stream. The XML stream, in the format specified by the shipping service, will be sent to the shipping server using a HyperText Transfer Protocol (HTTP) request. Once the shipping module 296 receives a response from the shipping server, ColdFusion will parse the XML stream into a set of objects that are then passed back to offer processor 288 where they are used to determine the shipping costs associated with the purchase.

Purchase order module 292 creates, emails, and saves purchase orders that are created as a result of the completion of an purchase. As with the other check-out modules, purchase offer module 292 is initialized and controlled by offer processor 288. The purchase orders contains relevant transaction information and serves the purpose of notifying the vendor of the sale and required shipment. Furthermore, the distributor of transaction system 200 can also file a copy of the purchase order as a record of the transaction. The information needed to create the purchase orders is provided by offer processor 288. The content of the purchase orders can be formatted using Cascade Style Sheet code into a readable format. Moreover, purchase orders can be saved as an Adobe Portable Document Format (PDF) file, which can then be emailed to any desired location such as a warehouse or the customer, or can be stored by the distributor as a transaction record.

The application server used by transaction system 200 has the ability to create and email PDF files using data supplied by offer processor 288, and purchase orders are sent to vendors, for each product to be shipped, via an email attachment. A vendor uses the purchase order to fill and ship the customer's order, and the distributor uses the purchase order as a transaction record. The purchase order PDF files can be protected using passwords and 128-bit SSL encryption technology to prevent unauthorized viewing or alteration. The integrity of the purchase orders will be enhanced by designating all purchase orders as read-only files that cannot be altered. The vendor can supply the password for opening and viewing the purchase order received via email. Finally, accounting module 294 performs the final step in the transaction process by creating an invoice for accounting purposes. Accounting information can be generated in an appropriate format (e.g., XML, SOAP, Scribe, etc.) and communicated to accounting software that the distributor has linked to the transaction system 200.

Having described the check-out modules in detail, the following exemplary scenario will provide an overview of the check-out process. Assuming that a customer has committed to purchasing five products totaling $4000 by credit card, transaction system 200 will require payment in the amount of $4000 in order for the sale to be considered complete. Moreover, transaction system 200 can be configured such that the customer will not be permitted to shop for additional items on transaction system 200 until full payment is made. Several actions must be completed before transaction system 200 considers an item to be paid in full. The offer processor 288 determines the total payment required (e.g., $4000) based on the product sub-total, sales tax, and shipping costs. The customer's stored shipping preferences are used by shipping module 296 to determine current shipping costs using current shipping rate data that shipping module 296 retrieves from the appropriate shipping carrier. During the payment process, the customer will pay for the products directly on the transaction system website using their credit card. The payment module 290 will then handle all the transactions with the selected online payment company. Based on the sale, purchase order module 292 creates an Adobe PDF-based purchase order that is emailed to the appropriate vendor(s). A separate invoice will also be sent from the transaction system 200 to the customer, confirming the order and providing an invoice of the total purchase price. Finally, the accounting module 294 creates an electronic PDF format invoice that is used to update the distributor's accounting records.

Figure 3:
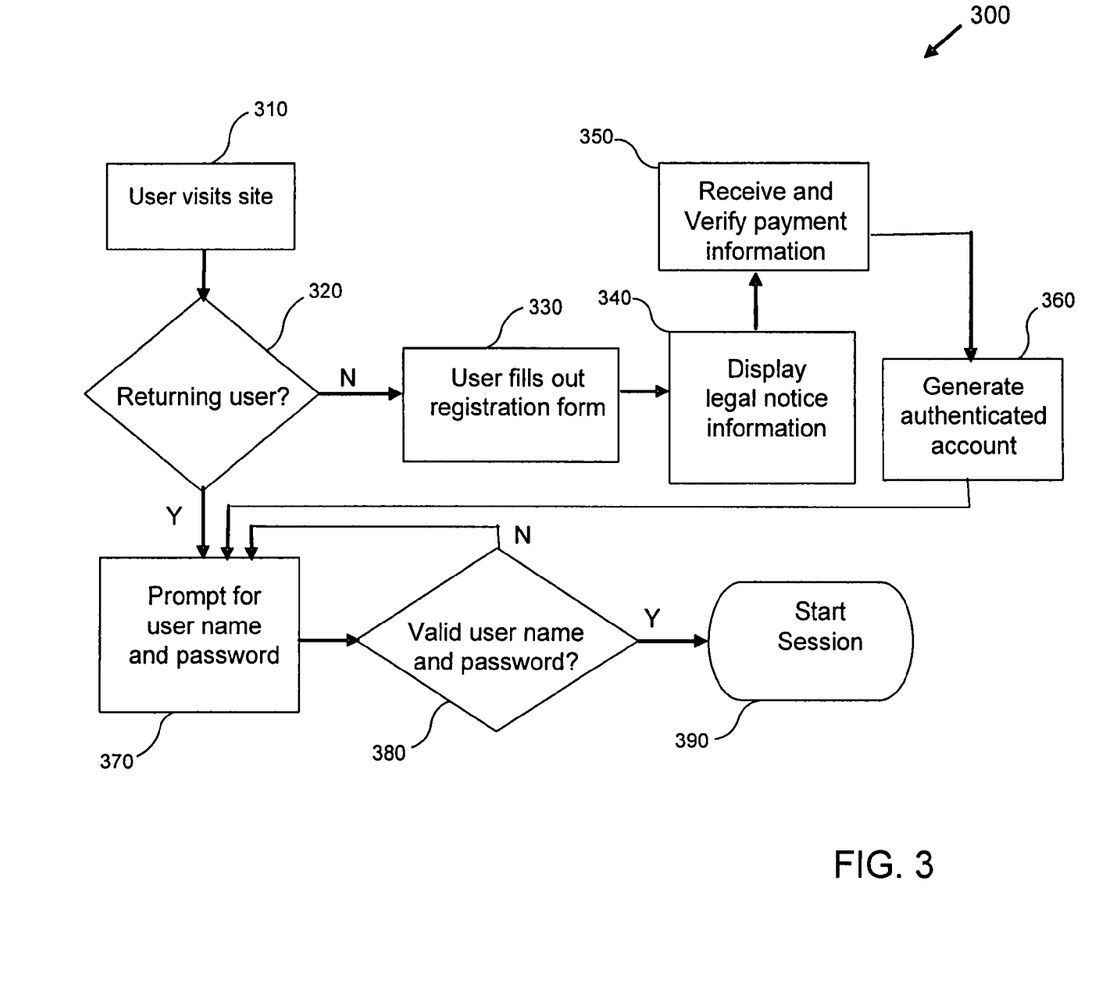
FIG. 3 is a flowchart illustrating a login/registration process in accordance with an exemplary embodiment of the present invention.

FIG. 3 illustrates customer login/registration process 300, a process whereby new users can create accounts and returning users can validate their identity, in accordance with an exemplary embodiment of the present invention. For the purpose of describing login/registration process 300, reference will be made to the "transaction system," an exemplary embodiment of which is represented by transaction system 200 of FIG. 2. The steps in login/registration process 300 can be carried out via login/registration module 284 of FIG. 2, as described above. At step 310, a user (i.e., buyer) starts the login/registration process by visiting the transaction system's website, i.e., by establishing communications with the transaction system's Uniform Resource Locator (URL) via a web browser. For example, the user can start a TCP/IP client program that directs it to the transaction system's IP address, or a user can select a direct line to the transaction system. Once the user has arrived at the transaction system website, at step 320 the transaction system determines whether the user is a returning user or a new user.

If the user is new, then the transaction system directs the user to fill out a registration form at step 330. The registration form acquires user information such as the buyer/vendor status, name, address, organizational affiliation, shipping address, billing address, password, credit card account number, expiration date, or other user information. At step 340, the transaction system displays legal notice information to ensure that the user is aware of the legal agreement it has with the distributor. Then, at step 350, the new user is directed to a page where the transaction system receives and verifies the user's payment information. In an alternate embodiment, step 350 can occur at some earlier or later point in the transaction process, e.g., after a customer offer has been accepted by offer processor 288. Verification can be performed in a manner known by one of ordinary skill in the art. For example, verification can be performed immediately via electronic services, or alternatively, through a more time consuming credit investigation process. In an exemplary embodiment, the user can search for products and initiate transactions while the verification process is in progress. At step 360, an authenticated account is generated for the user. If the user is found to be a returning user, or if a new user has been determined to have an authenticated account, the user is prompted for a log-in name and password at step 370. If the log-in name and password entered by the user are not valid, then step 380 requires the user to re-enter its log-in name and password. In an exemplary embodiment, the user is allowed three attempts to enter a valid log-in name and password. In another embodiment, if the user is not able to provide a valid log-in name and password, the session is terminated and the user is not permitted to continue visiting the site for some specified period. However, if the user does successfully provide a log-in name and password, the user session is started at step 390.

Figure 4:
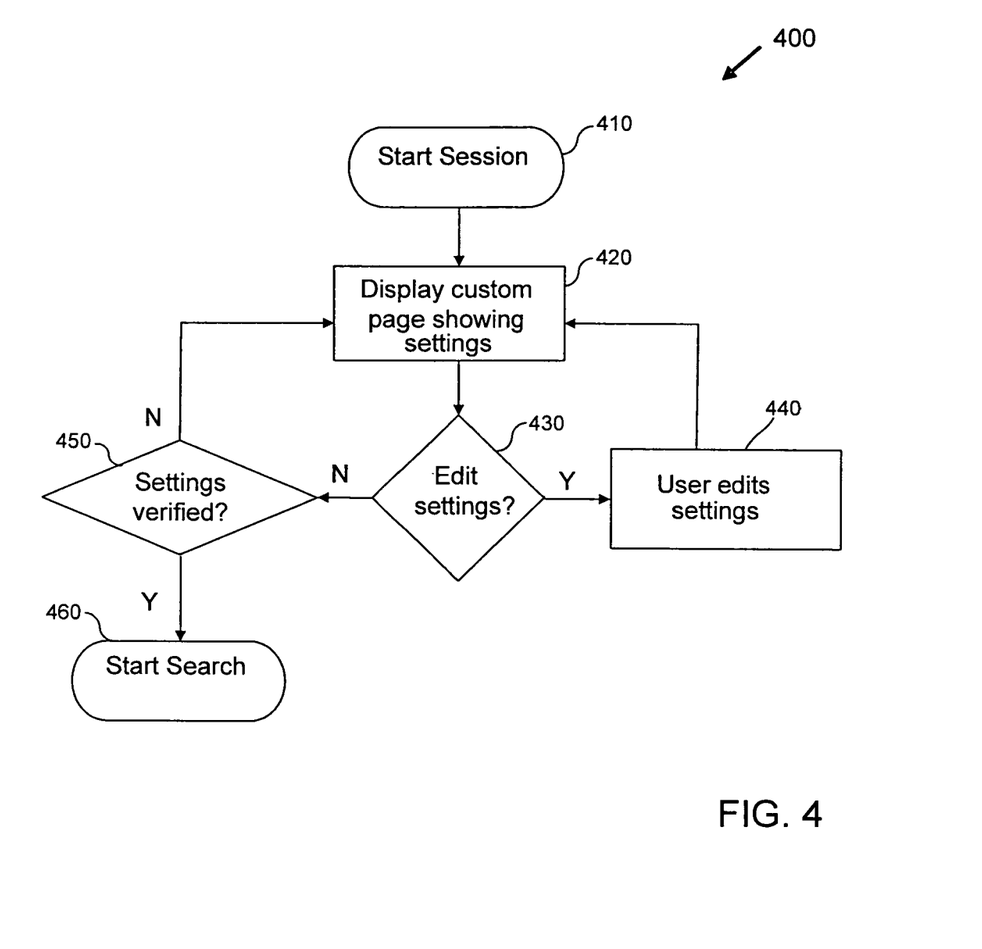
FIG. 4 is a flowchart illustrating a settings customization process in accordance with an exemplary embodiment of the present invention.

FIG. 4 is a flowchart illustrating a settings customization process 400 in accordance with an exemplary embodiment of the present invention. In an exemplary embodiment of the present invention, settings customization process 400 immediately follows login/registration process 300 described above. The steps in settings customization process 400 can be carried out via login/registration module 284 of FIG. 2, as described above. At step 410 a session is started once the user has provided a valid log-in name and password. At step 420, the user's custom page is displayed along with the user's settings. If the user is new, the settings displayed at step 420 are default settings. Alternatively, a user's settings can be loaded from previously stored information, such as from a buyer database, vendor database, or a file or cookie stored on the user's computer. Next, at step 430 the user is presented with a means (e.g., menu, button, etc.) for editing the current settings. If the user chooses to edit settings, then the user is directed to step 440. At step 440, the user makes the desired changes and the new settings are updated and displayed on the user's custom page at step 420. If, at step 430, the user chooses not to edit the settings, then the user is directed to step 450. At step 450, the user is given the option of verifying his or her setting details before proceeding with the product search. If the user chooses not to verify the settings, the user is returned to the custom page of step 420 and allowed to edit the user's settings until the user verifies the settings at step 450. When the user verifies the settings at step 450, the transaction system allows the user to begin the product search process at step 460.

Figure 5:
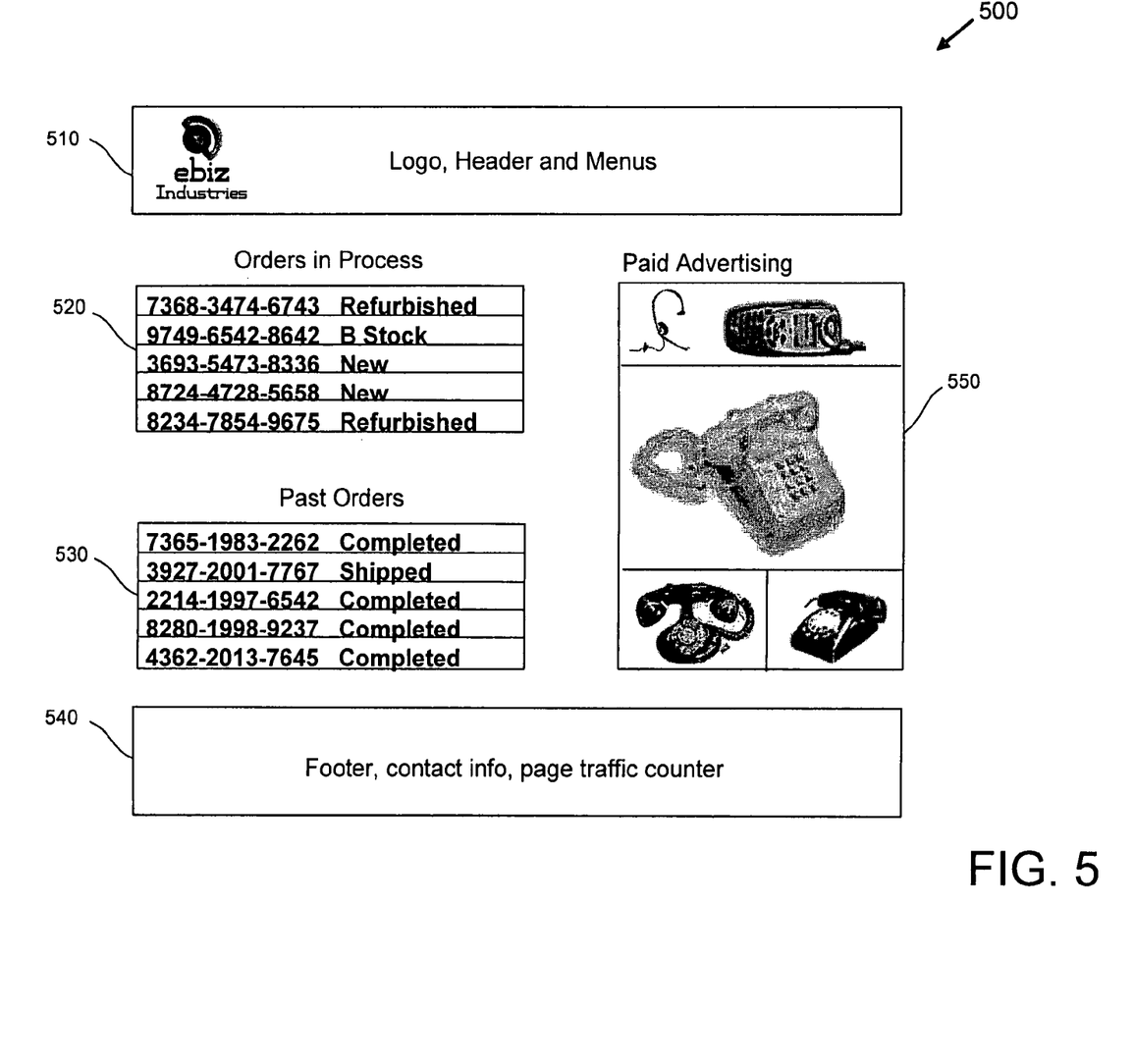
FIG. 5 illustrates a screenshot of a customized display in accordance with an exemplary embodiment of the present invention.

FIG. 5 illustrates a screenshot of a customized display page 500 in accordance with an exemplary embodiment of the present invention. Header field 510 is located at the top of the customized display page 500 and includes the distributor's logo, header information, and user menus. At the bottom of the page, footer field 540 includes footer information, containing contact information, a traffic counter for the site, and other occasionally used information. On the right hand side of the page, paid advertising field 550 is displayed so that vendors can introduce new products, popular options, or otherwise stimulate the user's interest, resulting in further revenues for the distributor. Orders in process field 520 displays a listing of the user's currently pending orders. Finally, past orders field 530 displays a listing of past orders submitted by the user, along with the status of those orders, i.e., whether the product has been shipped or the order has been completed.

Figure 6:
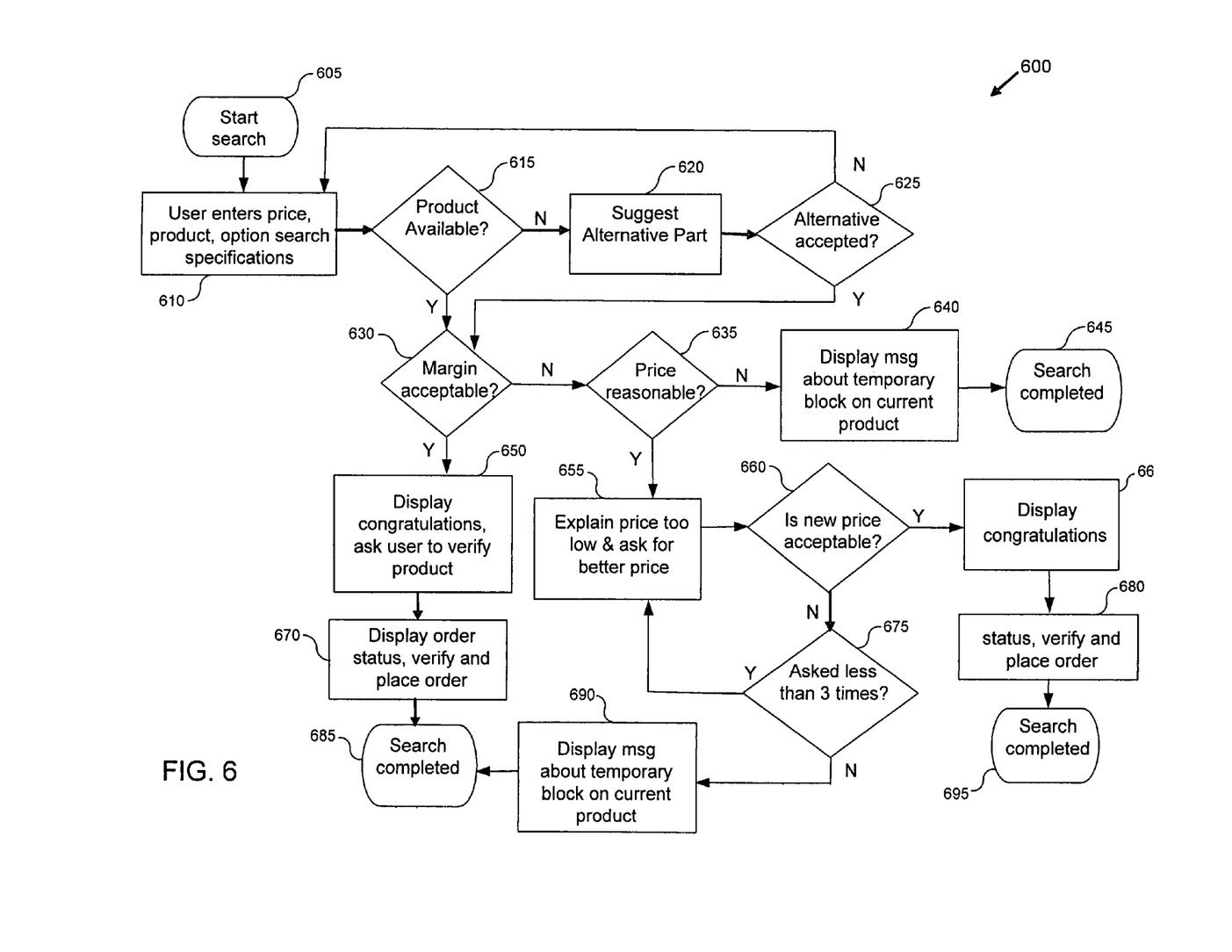
FIG. 6 is a flowchart illustrating a product search process in accordance with an exemplary embodiment of the present invention.

FIG. 6 is a flowchart illustrating a product search process 600 in accordance with an exemplary embodiment of the present invention. In this embodiment, the product search process 600 immediately follows the settings customization process 400 described in FIG. 4. Product search process 600 can be implemented via the customer offer module 286 described in conjunction with FIG. 2. At step 605, the user has verified the user's settings and advances to the product search process. At step 610, the user is prompted to conduct a search based on the product part number, product manufacturer, or keyword in the product description. The user can also select from product options that may be available for each chosen product, such as the condition (e.g., refurbished, unused, or domestic), warranty (e.g., none, 90-day, 1-year), and whether a revision requirement is needed for the part. In this embodiment, the user also submits an offer price for each product that the user wishes to purchase. Alternatively, the user may not submit an offer price until it is verified that the desired product is available for sale. At step 615 a product search query is sent to the database (e.g., database 298 of FIG. 1) to determine if the specified product is available, regardless of price. If the product is available, then at step 630 the transaction system determines whether the price offered by a user provides a margin with which the distributor can recover costs and earn a reasonable profit. Determinations regarding the reasonableness of an offer with respect to margins are illustrated by product margin chart 900 of FIG. 9. If the margin exceeds a minimum margin, then at step 650 the system displays a congratulations message and asks the user to confirm the transaction.

However, if the product is not available, at step 620 the system may suggest an alternative product by searching the database 298 for substantially similar products. For example, if a user requests XYZ manufacturer part number 9114 in color black and the item is not found in database 298, then at step 620 the system may suggest XYZ manufacturer part number 9114 in color grey. At step 625, the user can accept or reject the alternative product. If the user accepts the alternative product, then at step 630 the transaction system determines whether the margin resulting from the buyer's offer exceeds a minim margin. If the margin does not exceed the minimum margin, then at step 635 the system determines whether the buyer's offer price is reasonable. If the price is not reasonable, then at step 640 the user is presented with a message stating that there is a temporary block on the product, and the search is terminated at step 645. If the price is determined to be reasonable, but not adequate for satisfying the margin requirements of the distributor, then at step 640 the transaction system explains to the user that the price is too low. Furthermore, the user is prompted to enter a new price, and the transaction system determines whether the new price is acceptable for that product. If the price is not acceptable, then the system may again ask the user to raise its price. The system would repeat this process for a predetermined number of times.

For example, if the predetermined number is three, and if the system has prompted the user less than three times, then the user is redirected to step 655 where the transaction system again explains to the user that the price is too low and the user is again prompted for a new price. If the user has already chosen a new price three times, then at step 690 the transaction system displays a message about putting a temporary block on that product and the search is terminated at step 695. If the new price is acceptable, then at step 665, the transaction system displays a congratulations message and states that the user has purchased the selected product and at step 680 the transaction system displays the order status and places an order to the vendor to purchase the product. The search is then terminated at step 695.

Figure 7:
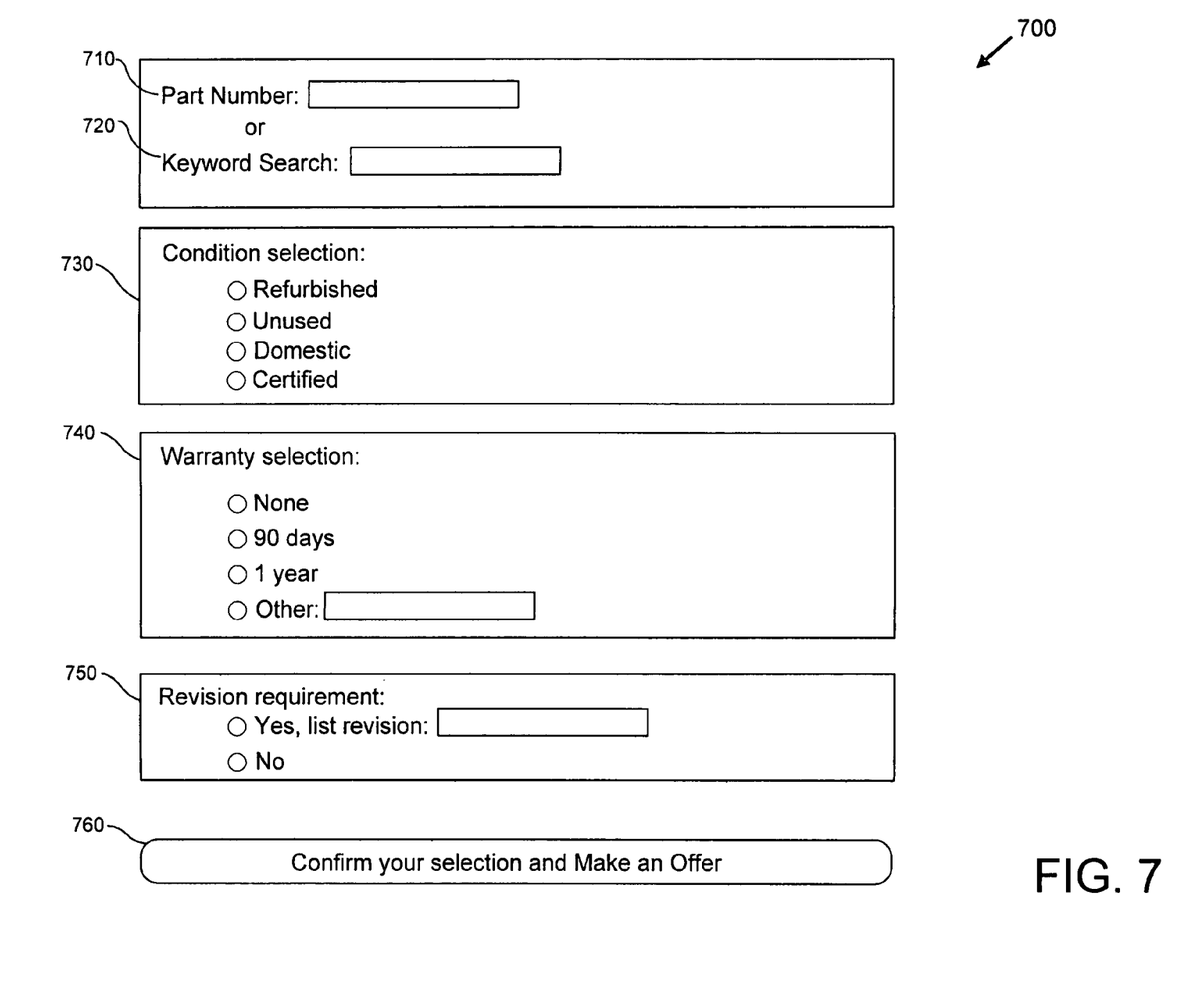
FIG. 7 illustrates a screenshot of a product selection form in accordance with an exemplary embodiment of the present invention.

FIG. 7 is a screenshot of an exemplary product selection form 700 that is provided to the potential buyer via customer offer module 286 of FIG. 2, as described above. If the potential buyer knows the part number of the desired item, the buyer can enter the part number into part number search field 710. Alternatively, the user may conduct keyword search using terms such as the manufacturer name or model, via keyword search field 720. The desired condition of the product can be selected in condition selection field 730, and options may include refurbished, unused, domestic, or certified. Next, in warranty selection field 740, the potential buyer can select the type of warranty the buyer would like for the item. Examples of warranty options include none (no warranty), 90 days, one year, or some other type that the potential buyer can specify. If a revision is required for the desired product, then at revision requirement field 750 the buyer can specify the revision type. Finally, the potential buyer can press button 760 to proceed to a screen containing a summary of the selection information along with an offer price field. The buyer can then review the information and submit an offer price.

Figure 8:
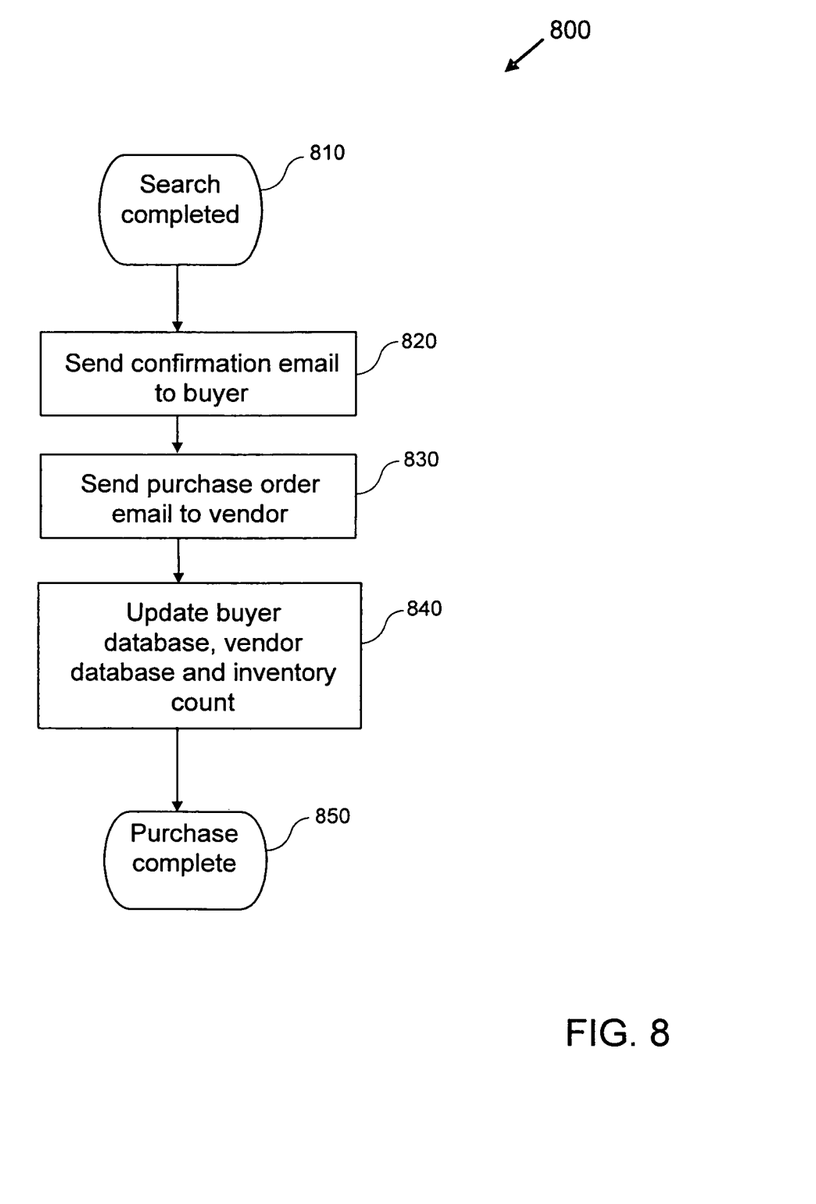
FIG. 8 is a flowchart illustrating a check-out process in accordance with an exemplary embodiment of the present invention.

FIG. 8 is a flowchart illustrating a check-out process 800 in accordance with an exemplary embodiment of the present invention. The steps described in check-out process 800 are performed via one or more of the check-out modules as described in the discussion of FIG. 2, i.e., payment processing module 290, purchase order module 292, accounting module 294, and shipment module 296. In an exemplary embodiment, check-out process 800 immediately follows product search process 600 of FIG. 6. At step 810, the user has completed a product search. Next, at step 820, a confirmation email is sent to the buyer. At step 830 a purchase order is sent to the selected vendor via an email form for the distributor to purchase the product from the selected vendor for resale to the buyer. At step 840, the buyer database and vendor database are updated to reflect the transaction, and to record the change in vendor inventory count for the product. At step 850, the transaction is complete.

FIG. 9 illustrates a screenshot of a product margin chart 900 in accordance with an exemplary embodiment of the present invention. A distributor uses the information contained in markup chart 900 to calculate a markup for each product. Margin chart 900 includes information such as the product part number, vendor's cost, vendor's markup, total distribution cost, vendor name, the distributor's target markup (MU), and the distributor's final profit. The information shown in product margin chart 900 reflects the exemplary situation in which the customer has made an offer of $60 for part number 9114-000-000. To determine if the buyer's offer price is acceptable, vendor offerings of a requested part number are analyzed with respect to the cost, the minimum acceptable distributor markup, and the total minimum reselling price (cost plus minimum markup). If a buyer's offer price is acceptable for a plurality of vendors selling that same product, the database query returns all such listings. In the example of product margin chart 900, the database query has returned four product listings from four different vendors. In order to maximize profits, a distributor will usually select the listing that results in the highest final profit, and uses that vendor as the source of the product for the buyer. If a buyer's price is acceptable for only one vendor, that vendor's offering alone is listed and chosen for the transaction. As shown in product margin chart 900, the final profit is higher than the target markup for three vendors, i.e., vendors ABC, XYZ, and PQR which provide final profits of 35%, 92%, and 43%, respectively. Using vendor DEF would result in a 19% final profit that falls short of the 20% target markup. Assuming that the customer wants 25 units, the distributor would first select the vendor that provides for the highest final profit, in this case vendor XYZ. Assuming that vendor XYZ only has 15 units available, the first 15 units of the order would be filled using all of vendor XYZ's 15 available units, and the other 10 units would be filled using vendor ABC. In another embodiment, the listings in product margin chart are arranged in order from the highest final profit to the lowest final profit.

Figure 10:
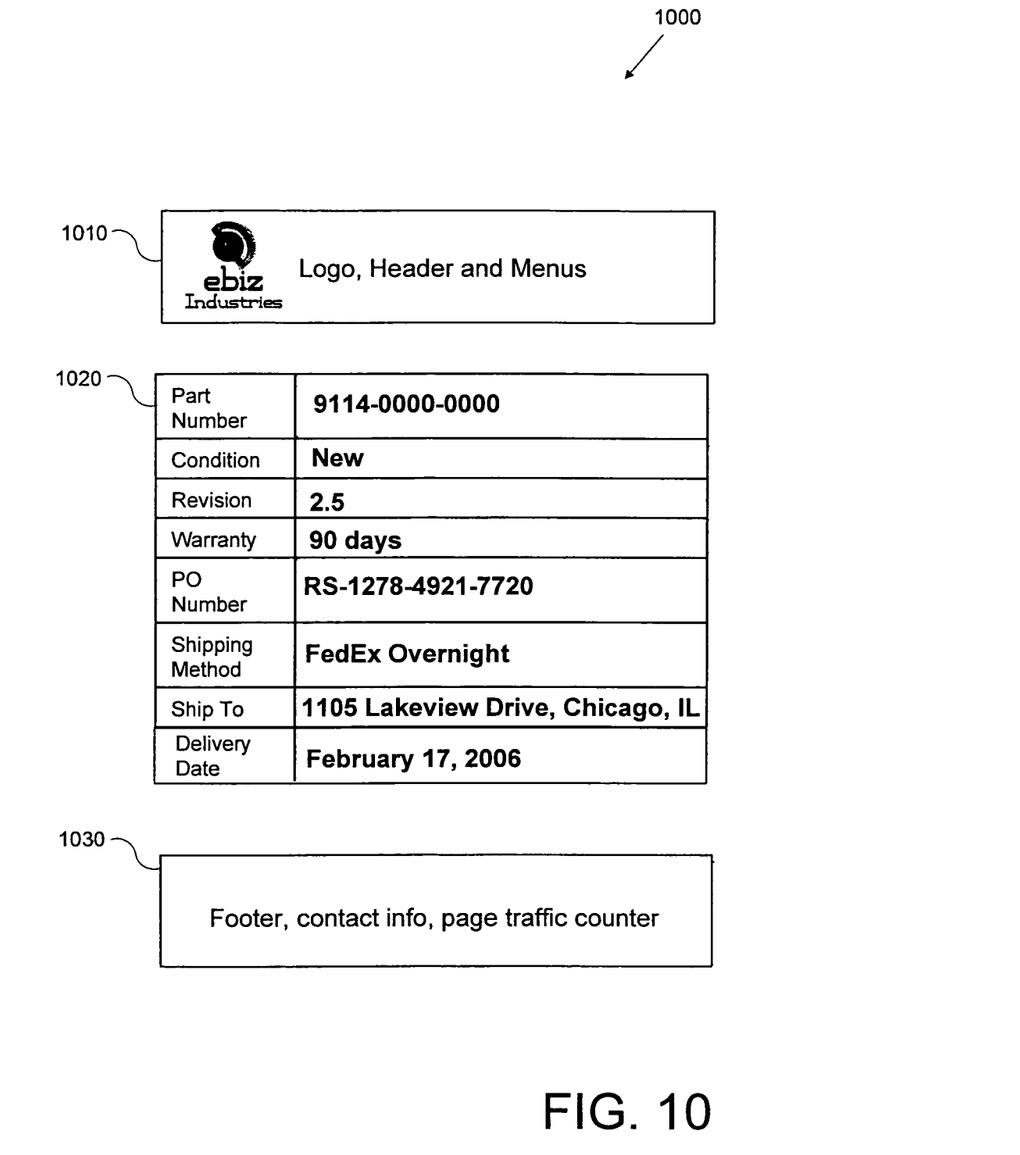
FIG. 10 illustrates a screenshot of a transaction confirmation page in accordance with an exemplary embodiment of the present invention.

FIG. 10 illustrates a screenshot of a transaction confirmation page 1000 in accordance with an exemplary embodiment of the present invention. Displayed at the top of the page, header 1010 includes a distributor logo, header information, and menus. Displayed at the bottom of the page, footer 1030 includes contact information and a website traffic counter. In the middle of a page, transaction summary 1020 displays a variety of information associated with the transaction. In an exemplary embodiment, transaction summary 1020 includes the product part number, condition, revision number, warranty, purchase order (PO) number, shipping method, shipping address, and estimated delivery date.

The invention has been described herein using specific embodiments for the purposes of illustration only. It will be readily apparent to one of ordinary skill in the art, however, that the principles of the invention can be embodied in other ways. Therefore, the invention should not be regarded as being limited in scope to the specific embodiments disclosed herein, but instead as being fully commensurate in scope with the following claims.

I claim:

1. A system for processing the sale of goods comprising:
    a database comprising a list of goods of a plurality of suppliers available for sale, including a supplier sale price; and
    a processor in communication with the database, the processor comprising:
        a first module for automatically receiving up-to-date information on the goods for sale by suppliers and updating the database to reflect the information;
        a second module for electronically communicating with a potential customer to receive an offer to purchase a good without informing the potential customer of an acceptable purchase price for such good, said acceptable purchase price being a price that exceeds the supplier sale price by a predetermined sales margin, the offer including a purchase offer price, and for querying the database to determine if the requested good is available for sale;
        a third module for calculating the difference between the purchase offer price and the supplier sale price for such good to determine a sales margin and for generating an acceptance to the offer from the potential customer if the sales margin exceeds said predetermined margin and for generating a refusal of the offer if the sales margin does not exceed the predetermined margin; and
        a fourth module for generating a purchase order to the supplier to purchase such good if the sales margin exceeds a predetermined margin.

2. The system of claim 1 further comprising a fifth module for providing product information to a shipping service server, receiving up-to-date shipping rates from the server, and providing the shipping rates to the third module for use in determining the sales margin.

3. The system of claim 2 wherein the fifth module communicates with the shipping service server using XML formatted data that is sent to the shipping service servers via a SSL connection.

4. The system of claim 3 wherein the XML formatted data is sent to the shipping service server using a HyperText Transfer Protocol (HTTP) request.

5. The system of claim 1 wherein the third module is configured to offer for sale to the customer an alternate good that is available for sale if the good the customer offers to purchase is not available for sale.

6. The system of claim 1 wherein the third module is configured to reject the offer if the sales margin is less than the predetermined margin.

7. The system of claim 1 wherein the third module is configured to prevent the customer from accessing the system if the difference between the purchase offer price and the supplier sale price is less than a minimum threshold.

8. The system of claim 1 wherein the third module is configured to generate a request for the customer to offer a higher purchase offer price, if the sales margin is less than the predetermined margin.

9. The system of claim 1 further comprising a sixth module for generating a customized web page for the customer based on the customer's industry.

10. The system of claim 9 wherein the sixth module is configured to customize the web page based on the buyer's prior purchase orders.

11. The system of claim 1 wherein the database comprises a list of goods of a plurality of suppliers available for sale, including a description, part number, identity of the supplier, and predetermined minimum margin.

12. The system of claim 11 wherein if the good the buyer offers to purchase is available from multiple suppliers, the third module is configured to select the good from the supplier that provides the greatest sales margin.

* * * * *